United States Patent
Ueda et al.

(10) Patent No.: US 6,344,495 B1
(45) Date of Patent: Feb. 5, 2002

(54) PHOTO-CURABLE RESIN COMPOSITION AND METHOD FOR FORMING CONCAVE-CONVEX PATTERN

(75) Inventors: Kenji Ueda; Satoshi Shioda; Mikiko Hojo, all of Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/362,726

(22) Filed: Jul. 29, 1999

(30) Foreign Application Priority Data

| Jul. 31, 1998 | (JP) | 10-218149 |
| Aug. 26, 1998 | (JP) | 10-239746 |
| Aug. 27, 1998 | (JP) | 10-241169 |
| Nov. 30, 1998 | (JP) | 10-340475 |
| Jun. 15, 1999 | (JP) | 11-167631 |

(51) Int. Cl.$^7$ .......... C08L 75/16; B29D 11/00; G02B 3/08
(52) U.S. Cl. .......... 522/96; 264/1.31; 264/1.38; 264/1.7; 427/162; 522/97
(58) Field of Search .................. 264/1.1, 1.31, 264/1.36, 1.38, 1.7; 359/596, 796; 522/90, 96, 97; 427/162, 163.1

(56) References Cited

U.S. PATENT DOCUMENTS 5,566,027 A  * 10/1996  Saitoh et al. .......... 522/96
5,629,804 A  *  5/1997  Tomono .......... 522/96

* cited by examiner

Primary Examiner—Mathieu D. Vargot
(74) Attorney, Agent, or Firm—Parkhurst & Wendel, LLP

(57) ABSTRACT

There is provided a photo-curable resin composition comprising a urethane-modified acrylic resin represented by structural formula (I) or (II) and a release agent as indispensable components:

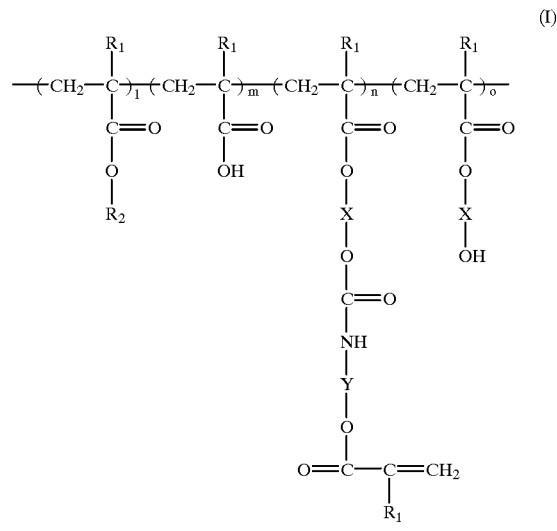

wherein five $R_1$'s each independently represent a hydrogen atom or a methyl group, $R_2$ represents a $C_1$–$C_{16}$ hydrocarbon group, X and Y each represent a straight-chain or branched alkylene group, and, with the sum of l, m, n, and o being 100, l is an integer of 20 to 90, m is an integer of 0 to 50, n is an integer of 10 to 80, and o is an integer of 0 to 20; and

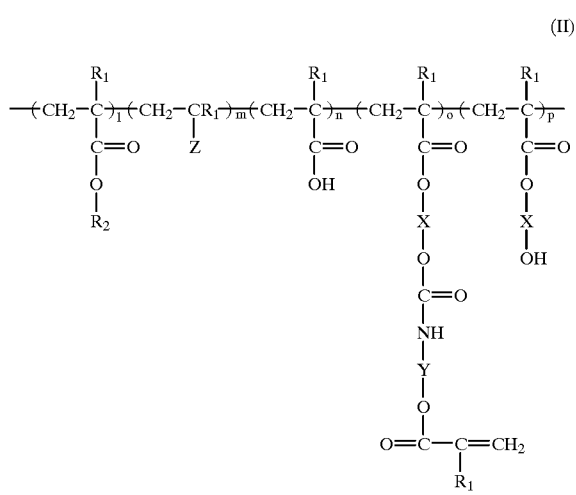

wherein Z represents a group having a bulky cyclic structure, six $R_1$'s each independently represent a hydrogen atom or a methyl group, $R_2$ represents a $C_1$–$C_{16}$ hydrocarbon group, X and Y each represent a straight-chain or branched alkylene group, and, with the sum of l, m, n, o, and p being 100, l is an integer of 20 to 90, m is an integer of 5 to 80, n is an integer of 0 to 50, o+p is an integer of 10 to 80, and p is an integer of 0 to 40.

11 Claims, 1 Drawing Sheet

PHOTO-CURABLE RESIN COMPOSITION AND METHOD FOR FORMING CONCAVE-CONVEX PATTERN

BACKGROUND OF THE INVENTION

1. Field of the Invention

The present invention relates to a photo-curable resin composition and a method for forming a concave-convex pattern. More particularly, the present invention relates to a photo-curable resin composition containing as a film-forming component a urethane-modified acrylic resin which can form a film simultaneously having heat resistance, softness and other properties, and a method for forming a concave-convex pattern, such as a diffraction grating or a relief hologram.

2. Background Art

Diffraction grating, relief holograms or the like have hitherto been produced by coating a photo-curable resin composition (coating composition) onto a substrate, for example, a polyester film, to form a photo-curable resin layer, imparting various concave-convex patterns to the photo-curable resin layer, exposing the resin layer to ultraviolet light or an electron beam to cure the resin layer, and then laminating a metal deposit or a layer having a refractive index different from the resin layer onto the surface of the formed concave-convex pattern to prepare a diffraction grating, a relief hologram or the like.

For example, in the formation of a relief hologram, an example of a method for imparting the concave-convex pattern comprises the steps of: providing a press stamper prepared from a master hologram with a desired concave-convex pattern formed thereon (hereinafter referred to simply as "press stamper"); putting the press stamper on the photo-curable resin layer and pressing (embossing) the resin layer to transfer the concave-convex pattern of the press stamper onto the resin layer; and, in this state, exposing the resin layer to cure the resin layer, thereby fixing the concave-convex pattern. When a large number of relief holograms are formed in this way, a large number of embosses are formed by means of a single press stamper.

The conventional photo-curable coating composition is in many cases liquid and thus has poor storage stability, leading to a fear of the quality of the resultant concave-convex pattern, such as holograms, being unstable. Further, since the conventional photo-curable coating composition contains many additives, repetition of embossing a large number of times causes components of the coating composition to be deposited onto the press stamper. This spoils the shape of a fine concave-convex pattern of the press stamper, here again resulting in unstable quality of holograms or the like.

Diffraction gratings and relief holograms have hitherto been used for decoration of or prevention of forgery of various cards, securities and other purposes. With the expansion of applications thereof, excellent strength, heat resistance, scratch resistance, water resistance, chemical resistance, and adhesion to substrates, as well as conformability to flexing or expansion/contraction of objects with diffraction gratings or relief holograms being applied thereon, have become required of the diffraction gratings and the relief holograms. In particular, in the case of diffraction gratings or relief holograms comprising the conventional photo-curable coating composition, the resin used loses its softness upon photo-curing, and, consequently, flexing or expansion/contraction of an object with the diffraction grating or relief hologram being applied thereon leads to the loss of functions as the diffraction grating or relief hologram.

In order to solve these problems, the present inventors have succeeded in providing, using material systems disclosed in Japanese Patent Laid-Open No. 156273/1986 and Japanese Patent Publication No. 54502/1993, photo-curable resin compositions which can form films having excellent strength, heat resistance, scratch resistance, water resistance, chemical resistance, and adhesion to substrates and, at the same time, can form diffraction gratings, relief holograms or the like having conformability to flexing or expansion/contraction of an object with the diffraction grating or relief hologram being applied thereon.

The reactive resin described in Japanese Patent Laid-Open No. 156273/1986 is prepared by addition bonding hydroxyethyl methacrylate again to a resin having hydroxyethyl methacrylate units in its main chain through a diisocyanate to introduce a double bond into the resin. Therefore, it is difficult to introduce the double bond as designed. Further, the reactive resin has an additional problem that the resin is likely to gel due to influence of a very small amount of water in the system. On the other hand, the reactive resin described in Japanese Patent Publication No. 54502/1993 is slightly inferior in water resistance due to the melamine skeleton, and, when a methylol group is present, unfavorably undergoes hydrolysis to evolve formaldehyde.

Accordingly, it is an object of the present invention to provide a photo-curable resin composition which can form films having excellent strength, heat resistance, scratch resistance, water resistance, chemical resistance, and adhesion to substrates and can form diffraction gratings, relief holograms or the like having conformability to flexing or expansion/contraction of an object with the diffraction grating or relief hologram being applied thereon.

SUMMARY OF THE INVENTION

The above object can be attained by the following present invention. Specifically, according to the present invention, there is provided a photo-curable resin composition comprising a urethane-modified acrylic resin represented by structural formula (I) or (II) and a release agent as indispensable components:

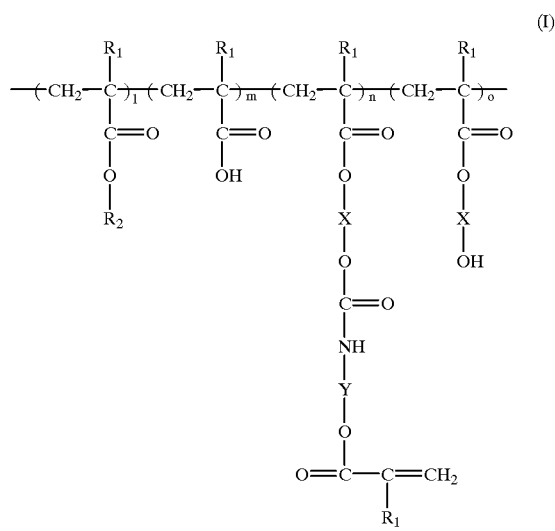

wherein five $R_1$'s each independently represent a hydrogen atom or a methyl group, $R_2$ represents a $C_1$–$C_{16}$ hydrocarbon group, X and Y each represent a straight-chain or branched alkylene group, and, with the sum of l, m, n, and o being 100, l is an integer of 20 to 90, m is an integer of 0 to 50, n is an integer of 10 to 80, and o is an integer of 0 to 20; and

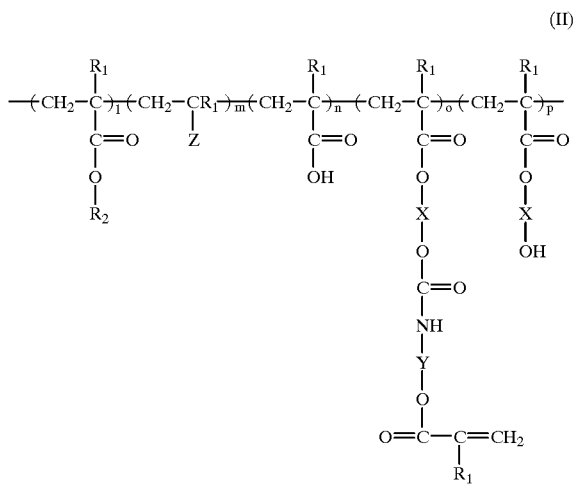

(II)

wherein Z represents a group having a bulky cyclic structure, six $R_1$'s each independently represent a hydrogen atom or a methyl group, $R_2$ represents a $C_1$–$C_{16}$ hydrocarbon group, X and Y each represent a straight-chain or branched alkylene group, and, with the sum of l, m, n, o, and p being 100, l is an integer of 20 to 90, m is an integer of 5 to 80, n is an integer of 0 to 50, o+p is an integer of 10 to 80, and p is an integer of 0 to 40.

According to a preferred embodiment of the present invention, the photo-curable resin composition further contains an organometal coupling agent.

The present invention further provides a method for forming a concave-convex pattern, comprising the steps of: coating the above photo-curable resin composition onto at least one side of a substrate and drying the coating to form a photo-curable resin layer; embossing the surface of the photo-curable resin layer; and then exposing the resin layer to cure the resin layer.

According to the present invention, use of a specific urethane-modified acrylic resin as a main film-forming component in the photo-curable resin composition can provide a photo-curable resin composition which can form films having excellent strength, heat resistance, scratch resistance, water resistance, chemical resistance, and adhesion to substrates and particularly excellent capability of a metal being vapor deposited thereon, and can form diffraction gratings, relief holograms or the like having conformability to flexing or expansion/contraction of an object with the diffraction grating or relief hologram being applied thereon.

Figure 1:
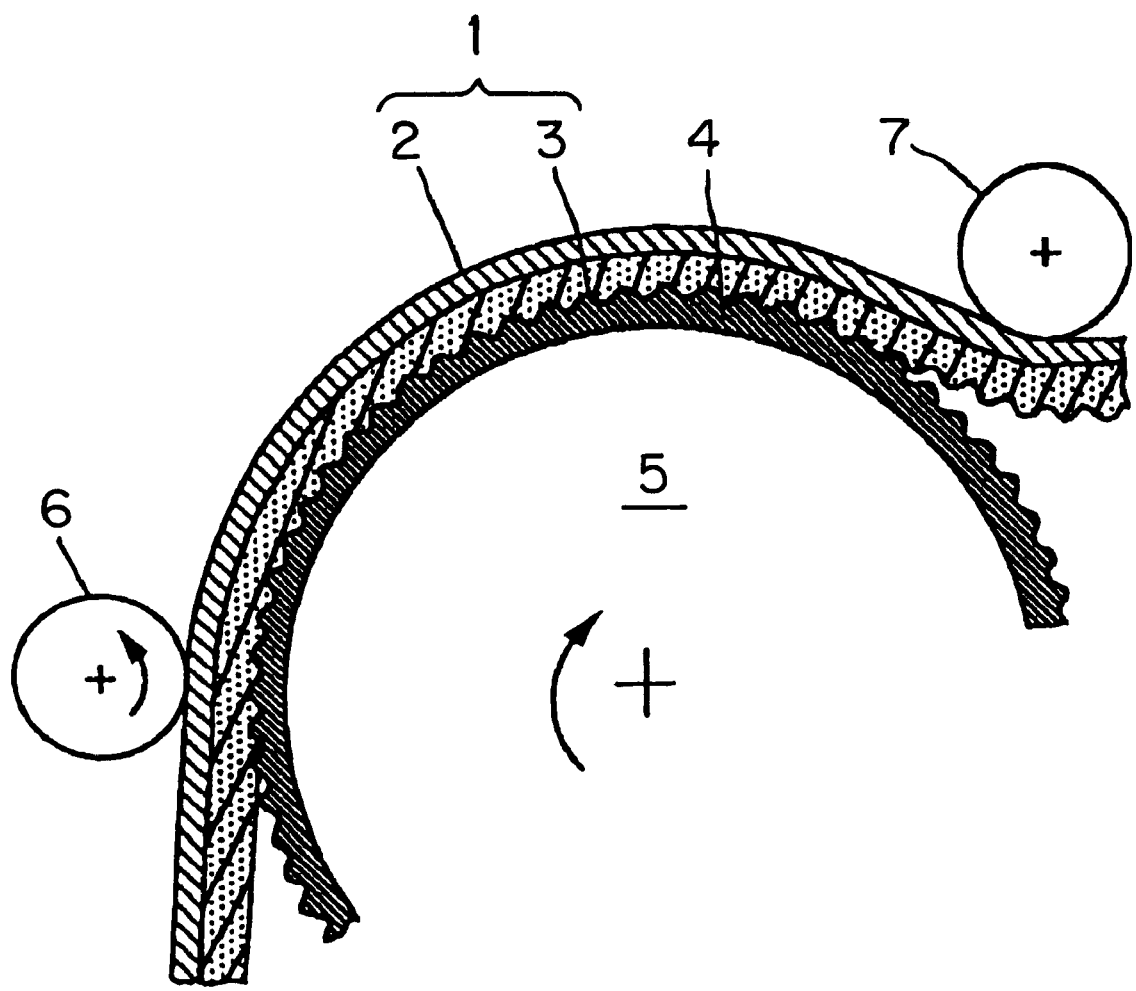
FIG. 1 is a diagram illustrating one embodiment of embossing in the method for forming a concave-convex pattern according to the present invention.

In the drawing, numeral 1 denotes a hologram-forming film, numeral 2 a substrate film, numeral 3 a curable resin, numeral 4 an original plate of a hologram, numeral 5 an emboss roller, numeral 6 a press roller, and numeral 7 a guide roller.

DETAILED DESCRIPTION OF THE INVENTION

The present invention will be described in more detail with reference to the following preferred embodiments.

An example of preferred urethane-modified acrylic resins usable in the present invention is, in the case of the urethane-modified acrylic resin represented by formula (I), an acrylic copolymer produced by copolymerizing 20 to 90 moles of methyl methacrylate with 0 to 50 moles of methacrylic acid and 10 to 80 moles of 2-hydroxymethyl methacrylate; and, in the case of the urethane-modified acrylic resin represented by formula (II), an acrylic copolymer produced by copolymerizing 20 to 90 moles of methyl methacrylate with 5 to 80 moles of a vinyl monomer having a bulky group, 0 to 50 moles of methacrylic acid, and 10 to 80 moles of 2-hydroxyethyl methacrylate. In both the copolymers, hydroxyl groups present in the copolymers have been reacted, for example, with methacryloyloxyethyl isocyanate (2-isocyanate ethyl methacrylate).

Therefore, the copolymer is not required to be in such a state that all the hydroxyl groups present in the copolymer have been reacted with the methacryloyloxyethyl isocyanate. More specifically, the copolymer may be in such a state that at least 10% by mole, preferably not less than 50% by mole, of the hydroxyl groups in 2-hydroxyethyl methacrylate units have been reacted with the methacryloyloxyethyl isocyanate. Hydroxyl-containing monomers, such as N-methylolacrylamide, N-methylolmethacrylamide, 2-hydroxyethyl acrylate, 2-hydroxyethyl methacrylate, 2-hydroxypropyl acrylate, 2-hydroxypropyl methacrylate, 4-hydroxybutyl acrylate, and 4-hydroxybutyl methacrylate, may be used instead of or in combination with the 2-hydroxyethyl methacrylate.

Thus, for example, when the formation of diffraction gratings and the like is contemplated, the resin composition composed mainly of a urethane-modified acrylic resin with a large number of methacryloyl groups being introduced into the molecule through the utilization of hydroxyl groups present in a hydroxyl-containing acrylic resin enables ionizing radiations, such as ultraviolet light and electron beams, to be used as curing means and, in addition, can form diffraction gratings and the like possessing excellent softness, heat resistance and other properties despite high crosslink density.

In the preparation of the urethane-modified acrylic resin, the copolymer may be dissolved in a solvent capable of dissolving the copolymer, for example, toluene, ketone, cellosolve acetate, or dimethyl sulfoxide, to prepare a solution, to which methacryloyloxyethyl isocyanate is added dropwise with stirring of the solution to react isocyanate groups with hydroxyl groups in the acrylic resin to form a urethane bond, thereby introducing methacryloyl groups into the resin through the urethane bond. In this case, the amount of methacryloyloxyethyl isocyanate used is such that the ratio of the isocyanate group to the hydroxyl group in the acrylic resin is 0.1 to 5 moles, preferably 0.5 to 3 moles, of the isocyanate group per mole of the hydroxyl group. When the amount of methacryloyloxyethyl isocyanate used is one equivalent or more based on the amount of the hydroxyl group in the resin, there is a possibility that the methacryloyloxyethyl isocyanate is also reacted with carboxyl groups in the resin to create linkage of —CONH—$CH_2CH_2$—.

The above embodiment is such that, in formulae (I) and (II), all $R_1$'s and $R_2$'s represent a methyl group and X and Y each represent an ethylene group. The present invention, however, is not limited to this embodiment. Specifically, $R_1$'s each independently may represent a hydrogen atom or a methyl group. Further, specific examples of $R_2$ include methyl, ethyl, n- or iso-propyl, n-, iso-, or t-butyl, substituted or unsubstituted phenyl, and substituted or unsubstituted benzyl groups. Specific examples of X and Y include ethylene, propylene, diethylene, and dipropylene groups. The molecular weight of the whole urethane-modified acrylic resin, thus obtained, to be used in the present invention is preferably 10,000 to 200,000, more preferably 20,000 to 40,000, as measured using polystyrene as a standard.

In formula (II), Z represents a group having a bulky cyclic structure. Examples of compound having a cyclic structure include alicyclic hydrocarbons and heterocyclic compounds. The cyclic structure may be monocyclic or polycyclic (condensed ring). Further, a $C_1$–$C_{10}$ substituent may be attached to the side chain. The cyclic structure may be saturated or unsaturated. Specific examples of preferred groups having a cyclic structure include isobornyl and cyclohexyl groups.

Preferred monomers having a bulky group include, for example, monomers having a five-membered ring, a six-membered ring or a more bulky group, such as isobornyl (meth)acrylate, cyclohexyl (meth)acrylate, dicyclopentanyl (meth)acrylate, dicyclopentenyl (meth)acrylate, and EO-modified dicyclopentenyl (meth)acrylate.

Next, production examples of the urethane-modified acrylic resin to be used in the present invention will be described.

Production Example I-1

A 2-liter four-necked flask equipped with a condenser, a dropping funnel, and a thermometer was charged with 40 g of toluene and 40 g of methyl ethyl ketone (MEK) together with an azo initiator. A reaction was allowed to proceed at a temperature of 100 to 110° C. for 8 hr while dropwise adding a mixed solution composed of 22.4 g of 2-hydroxyethyl methacrylate (HEMA), 70.0 g of methyl methacrylate (MMA), 20 g of toluene, and 20 g of MEK through the dropping funnel over a period of about 2 hr. The system was then cooled to room temperature.

A mixed solution composed of 27.8 g of 2-isocyanatoethyl methacrylate (Karenz MOI, manufactured by Showa Denko K.K.), 20 g of propylene glycol monomethyl ether acetate, and 20 g of MEK was added to the reaction mixture. An addition reaction was carried out in the presence of dibutyltin laurate as a catalyst. Upon confirmation of the disappearance of an absorption peak at 2200 $cm^{-1}$ by IR analysis of the reaction product, the reaction was terminated.

Production Example I-2

A 2-liter four-necked flask equipped with a condenser, a dropping funnel, and a thermometer was charged with 40 g of propylene glycol monomethyl ether acetate and 40 g of methyl ethyl ketone (MEK) together with an azo initiator. A reaction was allowed to proceed at a temperature of 100 to 110° C. for 8 hr while dropwise adding a mixed solution composed of 22.4 g of 2-hydroxyethyl methacrylate (HEMA), 62.3 g of methyl methacrylate(MMA), 7.4 g of methacrylic acid (MAA), 20 g of propylene glycol monomethyl ether acetate, and 20 g of MEK through the dropping funnel over a period of about 2 hr. The system was then cooled to room temperature.

A mixed solution composed of 27.8 g of 2-isocyanatoethyl methacrylate (Karenz MOI, manufactured by Showa Denko K.K.), 20 g of propylene glycol monomethyl ether acetate, and 20 g of MEK was added to the reaction mixture. An addition reaction was carried out in the presence of dibutyltin laurate as a catalyst. Upon confirmation of the disappearance of an absorption peak at 2200 $cm^{-1}$ by IR analysis of the reaction product, the reaction was terminated.

Production Example I-3

A 2-liter four-necked flask equipped with a condenser, a dropping funnel, and a thermometer was charged with 50 g of propylene glycol monomethyl ether acetate and 50 g of MEK together with an azo initiator. A reaction was allowed to proceed at a temperature of 100 to 110° C. for 8 hr while dropwise adding a mixed solution composed of 22.4 g of HEMA, 57.85 g of MMA, 11.1 g of MAA, 20 g of propylene glycol monomethyl ether acetate, and 20 g of MEK through the dropping funnel over a period of about 2 hr. The system was then cooled to room temperature.

A mixed solution composed of 27.8 g of 2-isocyanatoethyl methacrylate (Karenz MOI, manufactured by Showa Denko K.K.), 20 g of propylene glycol monomethyl ether acetate, and 20 g of MEK was added to the reaction mixture. An addition reaction was carried out in the presence of dibutyltin laurate as a catalyst. Upon confirmation of the disappearance of an absorption peak at 2200 $cm^{-1}$ by IR analysis of the reaction product, the reaction was terminated.

Production Example I-4

A 2-liter four-necked flask equipped with a condenser, a dropping funnel, and a thermometer was charged with 50 g of propylene glycol monomethyl ether acetate and 50 g of MEK together with an azo initiator. A reaction was allowed to proceed at a temperature of 100 to 110° C. for 8 hr while dropwise adding a mixed solution composed of 22.4 g of HEMA, 57.85 g of MMA, 11.1 g of MAA, 20 g of propylene glycol monomethyl ether acetate, and 20 g of MEK through the dropping funnel over a period of about 2 hr. The system was then cooled to room temperature.

A mixed solution composed of 41.7 g of 2-isocyanatoethyl methacrylate (Karenz MOI, manufactured by Showa Denko K.K.), 20 g of propylene glycol monomethyl ether acetate, and 20 g of MEK was added to the reaction mixture. An addition reaction was carried out in the presence of dibutyltin laurate as a catalyst. Upon confirmation of the disappearance of an absorption peak at 2200 $cm^{-1}$ by IR analysis of the reaction product, the reaction was terminated.

Production Example I-5

A 2-liter four-necked flask equipped with a condenser, a dropping funnel, and a thermometer was charged with 35 g of propylene glycol monomethyl ether acetate and 35 g of MEK together with an azo initiator. A reaction was allowed to proceed at a temperature of 100 to 110° C. for 8 hr while dropwise adding a mixed solution composed of 11.2 g of HEMA, 62.3 g of MMA, 14.8 g of MAA, 20 g of propylene glycol monomethyl ether acetate, and 20 g of MEK through the dropping funnel over a period of about 2 hr. The system was then cooled to room temperature.

A mixed solution composed of 13.9 g of 2-isocyanatoethyl methacrylate (Karenz MOI, manufactured by Showa Denko K.K.), 20 g of propylene glycol monomethyl ether acetate, and 20 g of MEK was added to the reaction mixture. An addition reaction was carried out in the presence of dibutyltin laurate as a catalyst. Upon confirmation of the disappearance of an absorption peak at 2200 $cm^{-1}$ by IR analysis of the reaction product, the reaction was terminated.

Production Example I-6

A 2-liter four-necked flask equipped with a condenser, a dropping funnel, and a thermometer was charged with 40 g of toluene and 40 g of MEK together with an azo initiator. A reaction was allowed to proceed at a temperature of 100 to 110° C. for 8 hr while dropwise adding a mixed solution composed of 22.4 g of HEMA, 70.0 g of MMA, 20 g of toluene, and 20 g of MEK through the dropping funnel over a period of about 2 hr. The system was then cooled to room temperature.

A mixed solution composed of 27.8 g of 2-isocyanatoethyl methacrylate (Karenz MOI, manufactured by Showa Denko K.K.), 20 g of toluene, and 20 g of MEK was added to the reaction mixture. An addition reaction was carried out in the presence of dibutyltin laurate as a catalyst. Upon confirmation of the disappearance of an absorption peak at 2200 cm$^{-1}$ by IR analysis of the reaction product, the reaction was terminated.

Compositions of starting materials in the production of urethane-modified acrylic resins to be used in the present invention and the property values of the resins thus obtained are shown in Tables 1 and 2 below.

TABLE 1

|  | Molar amount of starting compounds | | | |
| --- | --- | --- | --- | --- |
|  | MMA | MAA | HEMA | MOI |
| Production Ex. I-1 | 80 | 0 | 20 | 20 |
| Production Ex. I-2 | 70 | 10 | 20 | 20 |
| Production Ex. I-3 | 65 | 15 | 20 | 20 |
| Production Ex. I-4 | 60 | 10 | 30 | 30 |
| Production Ex. I-5 | 70 | 20 | 10 | 10 |
| Production Ex. I-6 | 80 | 0 | 20 | 20 |

TABLE 2

|  | Property values | | | | |
| --- | --- | --- | --- | --- | --- |
|  | Nonvolatile component, wt % | Viscosity, mPa at 30° C. | Acid value, mg KOH/g | C=C content, mol % | Molecular weight, Mw |
| Production Ex. I-1 | 41.0 | 130 | 0 | 13.8 | 35000 |
| Production Ex. I-2 | 43.4 | 140 | 46 | 12.8 | 25000 |
| Production Ex. I-3 | 40.0 | 130 | 51 | 12.8 | 22000 |
| Production Ex. I-4 | 43.0 | 130 | 41 | 18.4 | 25000 |
| Production Ex. I-5 | 43.0 | 130 | 41 | 18.4 | 25000 |
| Production Ex. I-6 | 41.0 | 130 | 0 | 13.8 | 35000 |

In the table, the "C=C content" is the average number of double bonds per molecule of the polymer. The molecular weight indicated in the table is the number average molecular weight in terms of polystyrene. The molecular weight was measured by gel permeation chromatography (GPC) using tetrahydrofuran (THF) as a solvent.

Production Example II-1

A 2-liter four-necked flask equipped with a condenser, a dropping funnel, and a thermometer was charged with 40 g of toluene and 40 g of methyl ethyl ketone (MEK) together with an azo initiator. A reaction was allowed to proceed at a temperature of 100 to 110° C. for 8 hr while dropwise adding a mixed solution composed of 22.4 g of 2-hydroxyethyl methacrylate (HEMA), 53.4 g of methyl methacrylate (MMA), 7.4 g of methacrylic acid (MAA), 13.9 g of isobornyl acrylate (IBM), 30 g of toluene, and 20 g of MEK through the dropping funnel over a period of about 2 hr. The system was then cooled to room temperature.

A mixed solution composed of 27.8 g of 2-isocyanatoethyl methacrylate (Karenz MOI, manufactured by Showa Denko K.K.), 20 g of propylene glycol monomethyl ether acetate, and 20 g of MEK was added to the reaction mixture. An addition reaction was carried out in the presence of dibutyltin laurate as a catalyst. Upon confirmation of the disappearance of an absorption peak at 2200 cm$^{-1}$ by IR analysis of the reaction product, the reaction was terminated.

Production Example II-2

A 2-liter four-necked flask equipped with a condenser, a dropping funnel, and a thermometer was charged with 60 g of toluene and 60 g of MEK together with an azo initiator. A reaction was allowed to proceed at a temperature of 100 to 110° C. for 8 hr while dropwise adding a mixed solution composed of 22.4 g of HEMA, 44.5 g of MMA, 7.4 g of MAA, 44.4 g of IBM, 50 g of toluene, and 50 g of MEK through the dropping funnel over a period of about 2 hr. The system was then cooled to room temperature.

A mixed solution composed of 27.8 g of 2-isocyanatoethyl methacrylate (Karenz MOI, manufactured by Showa Denko K.K.), 40 g of propylene glycol monomethyl ether acetate, and 40 g of MEK was added to the reaction mixture. An addition reaction was carried out in the presence of dibutyltin laurate as a catalyst. Upon confirmation of the disappearance of an absorption peak at 2200 cm$^{-1}$ by IR analysis of the reaction product, the reaction was terminated.

Production Example II-3

A 2-liter four-necked flask equipped with a condenser, a dropping funnel, and a thermometer was charged with 40 g of toluene and 40 g of MEK together with an azo initiator. A reaction was allowed to proceed at a temperature of 100 to 110° C. for 8 hr while dropwise adding a mixed solution composed of 22.4 g of HEMA, 44.5 g of MMA, 7.4 g of MAA, 22.0 g of dicyclopentanyl methacrylate (DSPM), 30 g of toluene, and 30 g of MEK through the dropping funnel over a period of about 2 hr. The system was then cooled to room temperature.

A mixed solution composed of 27.8 g of 2-isocyanatoethyl methacrylate (Karenz MOI, manufactured by Showa Denko K.K.), 30 g of propylene glycol monomethyl ether acetate, and 30 g of MEK was added to the reaction mixture. An addition reaction was carried out in the presence of dibutyltin laurate as a catalyst. Upon confirmation of the disappearance of an absorption peak at 2200 cm$^{-1}$ by IR analysis of the reaction product, the reaction was terminated.

Production Example II-4

A 2-liter four-necked flask equipped with a condenser, a dropping funnel, and a thermometer was charged with 60 g of propylene glycol monomethyl ether acetate and 60 g of MEK together with an azo initiator. A reaction was allowed to proceed at a temperature of 100 to 110° C. for 8 hr while dropwise adding a mixed solution composed of 22.4 g of HEMA, 44.5 g of MMA, 7.4 g of MAA, 44.4 g of DSPM, 50 g of propylene glycol monomethyl ether acetate, and 50 g of MEK through the dropping funnel over a period of about 2 hr. The system was then cooled to room temperature.

A mixed solution composed of 27.8 g of 2-isocyanatoethyl methacrylate (Karenz MOI, manufactured by Showa Denko K.K.), 40 g of propylene glycol monomethyl ether acetate, and 40 g of MEK was added to the reaction mixture. An addition reaction was carried out in the presence of dibutyltin laurate as a catalyst. Upon confirmation of the disappearance of an absorption peak at 2200 cm$^{-1}$ by IR analysis of the reaction product, the reaction was terminated.

Production Example II-5

A 2-liter four-necked flask equipped with a condenser, a dropping funnel, and a thermometer was charged with 80 g of propylene glycol monomethyl ether acetate and 80 g of MEK together with an azo initiator. A reaction was allowed to proceed at a temperature of 100 to 110° C. for 8 hr while dropwise adding a mixed solution composed of 22.4 g of HEMA, 7.4 g of MMA, 117.6 g of cyclohexyl methacrylate (CHM), 60 g of propylene glycol monomethyl ether acetate, and 60 g of MEK through the dropping funnel over a period of about 2 hr. The system was then cooled to room temperature.

A mixed solution composed of 41.7 g of 2-isocyanatoethyl methacrylate (Karenz MOI, manufactured by Showa Denko K.K.), 60 g of propylene glycol monomethyl ether acetate, and 60 g of MEK was added to the reaction mixture. An addition reaction was carried out in the presence of dibutyltin laurate as a catalyst. Upon confirmation of the disappearance of an absorption peak at 2200 cm$^{-1}$ by IR analysis of the reaction product, the reaction was terminated.

Compositions of starting materials used in the production of urethane-modified acrylic resins to be used in the present invention and the property values of the resins thus obtained are shown in Tables 3 and 4 below.

TABLE 3

| | Molar amount of starting compounds | | | | | | |
|---|---|---|---|---|---|---|---|
| | MMA | MAA | HEMA | MOI | IBM | DSPM | CHM |
| Production Ex. II-1 | 60 | 10 | 20 | 20 | 10 | — | — |
| Production Ex. II-2 | 50 | 10 | 20 | 20 | 20 | — | — |
| Production Ex. II-3 | 60 | 10 | 20 | 20 | — | 10 | — |
| Production Ex. II-4 | 50 | 10 | 20 | 30 | — | 20 | — |
| Production Ex. II-5 | 0 | 10 | 20 | 20 | — | — | 70 |

TABLE 4

| | Property values | | | | |
|---|---|---|---|---|---|
| | Nonvolatile component, wt % | Viscosity, mPa at 30° C. | Acid value, mg KOH/g | C=C content, mol % | Molecular weight, Mw |
| Production Ex. II-1 | 44.2 | 110 | 51.2 | 12.8 | 22000 |
| Production Ex. II-2 | 45.4 | 70 | 48.3 | 12.8 | 21000 |
| Production Ex. II-3 | 40.8 | 170 | 49.9 | 12.8 | 23000 |
| Production Ex. II-4 | 44.0 | 80 | 51.9 | 12.8 | 22000 |
| Production Ex. II-5 | 60.0 | 80 | 48.6 | 12.8 | 25000 |

In the table, the "C=C content" is the average number of double bonds per molecule of the polymer. The molecular weight indicated in the table is the number average molecular weight in terms of polystyrene. The molecular weight was measured by gel permeation chromatography (GPC) using tetrahydrofuran (THF) as a solvent.

The photo-curable resin composition according to the present invention is characterized by comprising a film-forming component, composed mainly of the urethane-modified acrylic resin, dissolved together with a release agent and preferably an organometal coupling agent in a suitable organic solvent. The organic solvent used may be any solvent which can dissolve the urethane-modified acrylic resin. When coatability and drying properties are taken into considertion, however, organic solvents usable herein include: aromatic solvents, such as toluene and xylene; ketone solvents, such as acetone, methyl ethyl ketone (MEK), methyl isobutyl ketone, and cyclohexanone; and cellosolve organic solvents, such as methylcellosolve and ethylcellosolve. In particular, a mixed solvent composed of these solvents is preferred. The solid concentration of the urethane-modified acrylic resin in the composition is not particularly limited. In general, however, the solid concentration is preferably about 1 to 50% by weight.

The photo-curable resin composition according to the present invention contains, in addition to the urethane-modified acrylic resin, a release agent and an organometal coupling agent. Release agents usable herein include conventional release agents, for example, solid waxes, such as polyethylene wax, amide wax, and Teflon powder, surfactants, such as fluorine and phosphoric ester surfactants, and silicones. Particularly preferred release agents are modified silicones, and specific examples thereof include:

1) silicone oils of side chain modification type;
2) silicone oils of both ends modification type;
3) silicone oils of one end modification type;
4) silicone oils of side chain and both ends modification type;
5) methylpolysiloxanes containing trimethylsiloxy-silicic acid (called "silicone resin");

6) silicone-grafted acrylic resins; and 7) methylphenylsilicone oils.

Modified silicone oils are classified into reactive silicone oils and nonreactive silicone oils. Reactive silicone oils include amino-modified, epoxy-modified, carboxyl-modified, carbinol-modified, methacryl-modified, mercapto-modified, phenol-modified, and one-end reactive, and dissimilar functional group-modified silicone oils. Nonreactive silicone oils include polyether-modified, methylstyryl-modified, alkyl-modified, higher fatty acid ester-modified, hydrophilic group-modified, higher alkoxy-modified, higher fatty acid-modified, and fluorine-modified silicone oils.

Among the above silicone oils, reactive silicone oils of the type having a group reactive with the film-forming component is reacted with the resin in the course of curing of the resin layer, and bonded to the resin, and, therefore, can impart unique properties without bleeding on the surface of the resin layer on which a concave-convex pattern formed thereon is formed later. They are particularly effective in improving the adhesion to a deposit layer formed in the step of vapor deposition.

Organometal coupling agents, as described below, are added for improving the adhesion of the resin composition layer to substrates and layers adjacent to the resin composition layer, and examples thereof include conventional silane coupling agents, titanium coupling agents, and aluminum coupling agents. Preferred silane coupling agents include, for example, vinylsilane, acrylsilane, epoxysilane, and aminosilane. More specifically, examples of vinylsilanes usable herein include vinyltrichlorosilane, vinyltris(β-methoxyethoxy)silane, vinyltriethoxysilane, and vinyltrimethoxysilane. Examples of acrylsilanes usable herein include γ-methacryloxypropyltrimethoxysilane, and γ-methacryloxypropylmethyldimethoxysilane. Examples of epoxysilanes usable herein include β-(3,4-epoxycyclohexyl)ethyltrimethoxysilane, γ-glycidoxypropyltrimethoxysilane, and γ-glycidoxypropyl-methyldiethoxysilane. Examples of aminosilanes usable herein include N-β-(aminoethyl)-γ-aminopropyltrimethoxysilane, N-β-(aminoethyl)-γ-aminopropylmethyldimethoxysilane, γ-aminopropyltrimethoxysilane, and N-phenyl-γ-aminopropyltrimethoxysilane. Examples of other silane coupling agents usable herein include γ-mercaptopropyltrimethoxysilane, γ-chloropropylmethyldimethoxysiliane, and γ-chloropropylmethyldiethoxysilane. The titanium coupling agent or the aluminum coupling agent may be a titanium or aluminum compound having the same organic group as described above in connection with the silane coupling agent, and any conventional coupling agent may be used in the present invention.

Preferred examples of aluminum coupling agents include, for example, aluminum alcoholates, aluminum chelates, and cyclic aluminum oligomers. More specifically, examples of aluminum alcoholates include aluminum isopropylate, mono-sec-butoxyaluminum diisopropylate, aluminum sec-butylate, and aluminum ethylate; examples of aluminum chelates include ethyl acetoacetate aluminum diisopropylate, aluminum tris(ethyl acetoacetate), alkyl acetoacetate aluminum diisopropylate, aluminum monocetyl acetonate bis(ethyl acetoacetate), aluminum tris(acetyl acetonate); and examples of cyclic aluminum oligomers include cyclic aluminum oxide isopropylate.

According to the present invention, the photo-curable resin composition (coating composition) of the present invention may be processed as follows. For example, the resin composition is coated onto a substrate, for example, a polyester film, to form a photo-curable resin layer, various concave-convex patterns are imparted to the photo-curable resin layer, the resin layer is then exposed to ultraviolet light or an electron beam to cure the resin layer, and a metal deposit or a layer having a different refractive index is laminated onto the surface of the formed concave-convex pattern to prepare a diffraction grating, a relief hologram or the like.

Therefore, when the step of coating the composition onto the film (coating and drying) and the step of duplicating a hologram or the like are carried out separately from each other, the presence of tack on the surface of a layer formed by coating unfavorably causes blocking at the time of direct winding of the film having this layer thereon. Use of a solvent system, which is localized on the surface side of the coating, at the time of coating and drying is effective in preventing the blocking. This is also effective in enhancing repetitive embossing properties at the time of duplication. Further, when the surface of the layer formed by coating is tacky, a method may be adopted wherein a release film is laminated onto the layer surface followed by winding of the film. When the step of coating the composition onto the film (coating and drying) and the step of duplicating a hologram or the like are carried out in a continuous process, the above constraints are relaxed.

According to the present invention, in order to ensure good repetitive embossing properties, the addition of a release agent is necessary. The presence of the release agent, however, sometimes lowers the adhesion of a layer, formed by coating of the resin composition according to the present invention, to a substrate and the adhesion between the layer formed by coating and other layer stacked on the resin composition layer, for example, a thin metal layer, a thin layer of a metallic compound, or a thin layer of an organic or inorganic compound. Surface treatment for improving the adhesion, typified by corona treatment or the like, or the provision of an adhesion improving layer, such as a primer layer, on the surface of a substrate or the like is considered effective for improving the adhesion.

According to the present invention, however, instead of the provision of the adhesion improving layer on the substrate side as described above, the organometal coupling agent is incorporated into the resin composition to improve the adhesion of the resin composition layer to the substrate, which has been lowered due to the presence of the release agent, or the adhesion of the resin composition layer to various layers, as described above, stacked on the resin composition layer. The amount of the organometal coupling agent used is generally about 0.1 to 10 parts by weight, preferably 0.5 to 5 parts by weight, based on 100 parts by weight of the urethane-modified acrylic resin. When the amount of the coupling agent used is smaller than the lower limit of the above amount range, the adhesion to the substrate and the adhesion of the layer of the resin composition according to the present invention to the above layer stacked on the resin composition layer are unsatisfactory, posing problems including interfacial separation. On the other hand, when the amount of the coupling agent used exceeds the upper limit of the amount range, the separation between the press stamper and the layer of the resin composition according to the present invention is unsatisfactory. This makes it difficult to prevent contamination of the press stamper. Preferably, an organometal coupling agent is selected which is effective in improving the adhesion to a layer adjacent to the layer formed from the composition of the present invention, particularly various inorganic or metallic thin layers serving as a reflective layer described below. Specific several examples of preferred organometal coupling agents are described in working examples below.

According to the present invention, incorporation of the release agent (particularly silicone) into the resin composition, for example, when diffraction gratings and the like are prepared by embossing, improves the separation between the press stamper of the diffraction grating and the photo-cured resin layer, prevents the contamination of the press stamper, and enables the press stamper to be continuously used for a long period of time (this capability being referred to as "repetitive embossing properties"). The amount of the release agent used is generally about 0.1 to 50 parts by weigh, preferably about 0.5 to 10 parts by weight, based on 100 parts by weight of the urethane-modified acrylic resin. When the amount of the release agent used is less than the lower limit of the above amount range, the separation between the press stamper and the photo-cured resin layer is unsatisfactory, making it difficult to prevent the contamination of the press stamper. On the other hand, when the amount of the release agent used exceeds the upper limit of the above amount range, surface roughening of a coating by cissing occurs at the time of coating of the composition. Further, in this case, in the product, problems unfavorably occur including a deterioration in the adhesion of the resin composition layer to the substrate per se and the adhesion of the resin composition layer to an adjacent layer, for example, a deposit layer, or the occurrence of breaking of the film at the time of transfer (due to very weak film strength).

Further, in order to regulate the softness or crosslink density of the resin layer obtained after curing, the photo-curable resin composition of the present invention may contain a conventional thermoplastic resin or acrylic or other monofunctional or polyfunctional monomer oligomer and the like.

Examples of monofunctional compounds usable herein include mono(meth)acrylates, such as tetrahydrofurfuryl (meth)acrylate, hydroxyethyl (meth)acrylate, vinylpyrrolidone, (meth)acryloyloxyethyl succinate, (meth) acryloyloxyethyl phthalate, and examples of bifunctional or higher functional compounds usable herein include, when classified according to skeleton structure, polyol (meth) acrylates (such as epoxy-modified polyol (meth)acrylate and lactone-modified polyol (meth)acrylate), polyester (meth) acrylate, epoxy (meth)acrylate, urethane (meth)acrylate, and other poly(meth)acrylates having polybutadiene, isocyanuric acid, hydantoin, melamine, phosphoric acid, imide, phosphazene and other skeletons. That is, various ultraviolet- or electron beam-curable monomers, oligomers, and polymers are usable.

More specifically, examples of bifunctional monomers and oligomers include polyethylene glycol di(meth)acrylate, polypropylene glycol di(meth)acrylate, neopentyl glycol di(meth)acrylate, and 1,6-hexanediol di(meth)acrylate; examples of trifunctional monomers, oligomers, and polymers include trimethylolpropane tri(meth)acrylate, pentaerythritol tri(meth)acrylate, and aliphatic tri(meth) acrylate; examples of tetrafunctional monomers and oligomers include pentaerythritol tetra(meth)acrylate, ditrimethylolpropane tetra(meth)acrylate, and aliphatic tetra (meth)acrylate; and examples of pentafunctional or higher monomers and oligomers include dipentaerythritol penta (meth)acrylate, dipentaerythritol hexa(meth)acrylate and, in addition, (meth)acrylates having a polyester skeleton, a urethane skeleton, and phosphazene skeleton. The number of functional groups is not particularly limited. However, when the number of functional groups is less than 3, the heat resistance is likely to lower. On the other hand, when the number of functional groups is 20 or more, the softness is likely to lower. For this reason, in particular, the number of functional groups is preferably 3 to 20.

The amount of the monomer or oligomer used is generally about 5 to 40 parts by weight, preferably about 10 to 30 parts by weight, based on 100 parts by weight of the urethane-modified acrylic resin. When the amount of the monomer or oligomer used is less than the lower limit of the above amount range, the strength, heat resistance, scratch resistance, water resistance, and chemical resistance of the cured resin layer and the adhesion of the cured resin layer to the substrate are unsatisfactory. On the other hand, when the amount of the monomer or oligomer used exceeds the upper limit of the above amount range, the tackiness of the surface is high. This unfavorably poses problems including that blocking is likely to occur and, at the time of duplication of holograms or the like, a part of the material is left on the plate (press stamper), resulting in lowered repetitive embossing properties.

According to the present invention, when the photo-curable resin composition is cured by ultraviolet light, the addition of a photosensitizer to the composition is necessary. On the other hand, in the case of curing by electron beams, the addition of the photosensitizer is not required. Photosensitizer usable herein include various photosensitizers used in conventional ultraviolet-curable coating compositions, for example, benzoin compounds, such as benzoin, benzoin methyl ether, benzoin ethyl ether, benzoin isopropyl ether, α-methylbenzoin, and α-phenylbenzoin; anthra-quinone compounds, such as anthraquinone and methylanthraquinone; benzyl; diacetyl; phenyl ketone compounds, such as acetophenone and benzophenone; sulfide compounds, such as diphenyl disulfide and tetramethylthiuram sulfide; α-chloromethylnaphthalene; anthracene; and halogenated hydrocarbons, such as hexachlorobutadiene and pentachlorobutadiene. The amount of the photosensitizer used is preferably about 0.5 to parts by weight based on 100 parts by weight of the urethane-modified acrylic resin.

Incorporation of a polymerization inhibitor into the photo-curable resin composition of the present invention comprising the above components can improve the storage stability of the resin composition. Polymerization inhibitors usable herein include: phenols, such as hydroquinone, t-butylhydroquinone, catechol, and hydroquinone monomethyl ether; quinones, such as benzoquinone and diphenylbenzoquinone; phenothiazine; and copper compounds. Further, if necessary, accelerators, viscosity modifiers, surfactants, antifoaming agents, silane coupling agents and other various assistants may be added to the resin composition. The addition of polymeric materials, such as styrenebutadiene rubber, is also possible.

Next, several examples of applications of the photo-curable resin composition according to the present invention will be described. The photo-curable composition is coated on or impregnated into a substrate, such as a metal plate, paper, or polyethylene terephthalate. The coated substrate is then dried at a temperature high enough to vaporize the organic solvent contained in the composition, for example, is guided to and dried in a heating furnace of 100 to 165° C. for about 0.1 to one min, to form a photo-curable resin layer on the substrate.

The photo-curable resin layer is then subjected to patterning (embossing) of a desired relief hologram, for example, by means of a press stamper, followed by application of ultraviolet light, an electron beam or the like to photo-cure the resin layer.

The hologram thus obtained is generally of transmission type. Therefore, a reflective layer should be provided. Use of a metallic thin layer, which reflects light, as the reflective layer provides an opaque hologram. On the other hand, use of a layer of a material, which is transparent and has a refractive index different from that of the hologram layer, as the reflective layer provides a transparent hologram. Both of these types may be used in the present invention. The reflective layer may be formed by any conventional method, such as sublimation, vacuum deposition, sputtering, reactive sputtering, ion plating, or electroplating.

Metallic thin layers for opaque holograms include, for example, thin layers formed by using, either alone or in combination with two or more, metals, such as chromium, titanium, iron, cobalt, nickel, copper, silver, gold, germanium, aluminum, magnesium, antimony, lead, palladium, cadmium, bismuth, tin, selenium, indium, gallium, and rubidium, and oxides, nitrides and the like of these metals. Among the above metallic thin layers, thin layers of aluminum, chromium, nickel, silver, gold and the like are particularly preferred. The thickness of the thin layer is generally 1 to 10,000 nm, preferably 20 to 200 nm.

The thin layer for transparent holograms may be made of any material so far as the material is permeable to light and can develop hologram effect. An example of this type of material is a transparent material having a refractive index different from that of the resin constituting the hologram-forming layer (photo-cured resin layer). In this case, the difference of the refractive index is preferably not less than 0.1, more preferably not less than 0.5, most preferably not less than 1.0. A metallic reflective layer having a thickness of not more than 20 nm is an example of reflective layers other than described above. Preferred transparent reflective layers include layers of titanium oxide ($TiO_2$), zinc sulfide (ZnS), Cu—Al composite metal oxide and the like.

More specifically, the embossing of the hologram pattern is carried out, for example, by a conventional method using a pair of emboss rolls consisting of a metallic roll, with a press stamper being mounted on the periphery thereof, and a paper roll, for example, at a temperature of 50 to 150° C. and a pressure of 10 to 50 kg/cm². Embossing on one side suffices for contemplated results. However, embossing on both sides is also possible.

In embossing, the temperature setting of the emboss roll is important. Embossing at a relatively high temperature and a relatively high pressure is preferred from the viewpoint of faithful reproduction of the shape of embosses. On the other hand, embossing at a relatively low temperature and a relatively low pressure is preferred from the viewpoint of preventing the deposition of the resin onto the emboss plate. Further, in consideration of effective heat capacity, the carrying speed of the film for duplication is also important. Further, the selection of the release agent is also important in order to reduce the deposition of the resin composition onto the emboss roll.

Use of the photo-curable resin composition according to the present invention can realize the production of three-dimensional maps and posters. In the production of three-dimensional maps or posters, the photo-curable resin composition is coated on a substrate after offset printing, the coating is dried, and the photo-curable resin coating is embossed, followed by photo-curing to form a relief.

Further, films, metal plates and the like with a design being transferred thereon can be produced. Specifically, the photo-curable resin composition is coated on a first substrate of a polyethylene terephthalate release film or the like. The coating is dried, and a design is printed on the photo-curable resin layer. A hot stamping agent is then coated on the print surface. A second substrate of plywood, an ABS sheet, a zinc plate or the like is applied to the hot stamping agent. The printed resin layer is then transferred onto the second substrate by means of a roll for thermal transfer or the like. The release film is removed, and the exposed photo-curable resin layer is photo-cured to produce a film, a metal plate or the like with a design being transferred thereon.

Examples of lights usable for curing the photo-curable resin composition according to the present invention include high-energy ionizing radiations and ultraviolet light. Sources of high-energy ionizing radiations include accelerators, for example, a Cockcroft accelerator, a van de Graaff accelerator, a linear accelerator, betatron, and cyclotron. Electron beams accelerated by these accelerators are industrially most convenient and cost effective. In addition, radiations emitted from radioisotopes, nuclear reactor and the like, such as γ-ray, X-ray, α-ray, neutron, and proton may also be used. Ultraviolet light sources include, for example, ultraviolet fluorescent lamps, low-pressure mercury lamps, high-pressure mercury lamps, ultrahigh-pressure mercury lamps, xenon lamps, carbon arc lamps, and sunlamps.

The following examples and comparative examples further illustrate the present invention but are not intended to limit it. In the examples and comparative examples, "part(s)" or "%" is by weight unless otherwise specified.

EXAMPLE 1

The following photo-curable resin compositions were prepared using the resin solutions obtained in Production Examples I-1 to I-6 and II-1 to II-5.

| Composition A-1: | |
|---|---|
| Resin solution of Production Example I-1 (on a solid basis) | 100 parts |
| Silicone: methyl polysiloxanes containing trimethyl-siloxysilicic acid (tradename: KF-7312, manufactured by The Shin-Etsu Chemical Co., Ltd) | 1 part |
| Polyfunctional monomer (tradename: SR-399, manufactured by Sartomer) | 20 parts |
| Photosensitizer (tradename: Irgacure 907, manufactured by Ciba Specialty Chemicals, K.K.) | 5 parts |

The composition was diluted with methyl ethyl ketone (MEK) to adjust the solid content of the composition to 50%.

| Composition A-2: | |
|---|---|
| Resin solution of Production Example I-1 (on a solid basis) | 100 parts |
| Silicone: methyl polysiloxanes containing trimethyl-siloxysilicic acid (tradename: KF-7312, manufactured by The Shin-Etsu Chemical Co., Ltd) | 5 parts |
| Silane coupling agent: vinyltrichlorosilane (KA 1003, manufactured by The Shin-Etsu Chemical Co., Ltd) | 3 parts |
| Polyfunctional monomer (tradename: SR-399, manufactured by Sartomer) | 20 parts |
| Photosensitizer (tradename: Irgacure 907, manufactured by Ciba Specialty Chemicals, K.K.) | 5 parts |

The composition was diluted with methyl ehtyl ketone (MEK) to adjust the solid content of the composition to 50%.

Composition B-1:

| | |
|---|---|
| Resin solution of Production Example I-2 (on a solid basis) | 100 parts |
| Silicone: amino-modified reactive silicone oil (both ends modification type) (tradename: KF-8012, manufactured by The Shin-Etsu Chemical Co., Ltd) | 1 part |
| Polyfunctional monomer (tradename: SR-399, manufactured by Sartomer) | 20 parts |
| Photosensitizer (tradename: Irgacure 651, manufactured by Ciba Specialty Chemicals, K.K.) | 5 parts |

The composition was diluted with methyl ethyl ketone (MEK) to adjust the solid content of the composition to 50%.

Composition B-2:

| | |
|---|---|
| Resin solution of Production Example I-2 (on a solid basis) | 100 parts |
| Silicone: amino-modified reactive silicone oil (both ends modification type) (tradename: KF-8012, manufactured by The Shin-Etsu Chemical Co., Ltd) | 5 parts |
| Polyfunctional monomer (tradename: SR-399, manufactured by Sartomer) | 20 parts |
| Silane coupling agent: γ-methacryloxypropyltrimethoxysilane (KBM 503, manufactured by The Shin-Etsu Chemical Co., Ltd) | 3 parts |
| Photosensitizer (tradename: Irgacure 651, manufactured by Ciba Specialty Chemicals, K.K.) | 5 parts |

The composition was diluted with methyl ethyl ketone (MEK) to adjust the solid content of the composition to 50%.

Composition C-1:

| | |
|---|---|
| Resin solution of Production Example I-3 (on a solid basis) | 100 parts |
| Silicone oil: amino-modified reactive silicone oil (side chain modification type) (tradename: KF-860, manufactured by The Shin-Etsu Chemical Co., Ltd) | 1 part |
| Polyfunctional monomer (tradename: NK Oligo U-15HA, manufactured by Shin-Nakamura Chemical Co., Ltd.) | 20 parts |
| Photosensitizer (tradename: Irgacure 907, manufactured by Ciba Specialty Chemicals, K.K.) | 5 parts |

The composition was diluted with methyl ethyl ketone (MEK) to adjust the solid content of the composition to 50%.

Composition C-2:

| | |
|---|---|
| Resin solution of Production Example I-3 (on a solid basis) | 100 parts |
| Silicone oil: amino-modified reactive silicone oil (side chain modification type) (tradename: KF-860, manufactured by The Shin-Etsu Chemical Co., Ltd) | 5 parts |
| Polyfunctional monomer (tradename: NK Oligo U-15HA, manufactured by Shin-Nakamura Chemical Co., Ltd.) | 20 parts |
| Silane coupling agent: γ-methacryloxypropyltrimethoxysilane (KBM 403, manufactured by The Shin-Etsu Chemical Co., Ltd) | 3 parts |
| Photosensitizer (tradename: Irgacure 907, manufactured by Ciba Specialty Chemicals, K.K.) | 5 parts |

The composition was diluted with methyl ethyl ketone (MEK) to adjust the solid content of the composition to 50%.

Composition D-1:

| | |
|---|---|
| Resin solution of Production Example I-4 (on a solid basis) | 100 parts |
| Silicone oil: amino-modified reactive silicone oil (one end modification type) (tradename: KF-8012, manufactured by The Shin-Etsu Chemical Co., Ltd) | 1 part |
| Polyfunctional monomer (tradename: SR-399, manufactured by Sartomer) | 20 parts |
| Photosensitizer (tradename: Irgacure 907, manufactured by Ciba Specialty Chemicals, K.K.) | 5 parts |

The composition was diluted with methyl ethyl ketone (MEK) to adjust the solid content of the composition to 50%.

Composition D-2:

| | |
|---|---|
| Resin solution of Production Example I-4 (on a solid basis) | 100 parts |
| Silicone oil: amino-modified reactive silicone oil (one end modification type) (tradename: KF-8012, manufactured by The Shin-Etsu Chemical Co., Ltd) | 5 parts |
| Polyfunctional monomer (tradename: SR-399, manufactured by Sartomer) | 15 parts |
| Silane coupling agent: γ-aminopropyltrimethoxysilane (KBE 903, manufactured by The Shin-Etsu Chemical Co., Ltd) | 3 parts |
| Photosensitizer (tradename: Irgacure 907, manufactured by Ciba Specialty Chemicals, K.K.) | 5 parts |

The composition was diluted with methyl ethyl ketone (MEK) to adjust the solid content of the composition to 50%.

Composition E-1:

| | |
|---|---|
| Resin solution of Production Example I-5 (on a solid basis) | 100 parts |
| Silicone: methacryl-modified silicone oil (tradename: X-22-164B, manufactured by The Shin-Etsu Chemical Co., Ltd) | 3 parts |
| Polyfunctional monomer (tradename: SR-399, manufactured by Sartomer) | 20 parts |
| Photosensitizer (tradename: Irgacure 651, manufactured by Ciba Specialty Chemicals, K.K.) | 5 parts |

The composition was diluted with methyl ethyl ketone (MEK) to adjust the solid content of the composition to 50%.

Composition E-2:

| | |
|---|---|
| Resin solution of Production Example I-5 (on a solid basis) | 100 parts |
| Silicone: methacryl-modified silicone oil (tradename: X-22-164B, manufactured by The Shin-Etsu Chemical Co., Ltd) | 3 parts |
| Polyfunctional monomer (tradename: SR-399, manufactured by Sartomer) | 20 parts |
| Titanate coupling agent (KRTTS, manufactured by Ajinomoto Co., Inc.) | 3 parts |
| Photosensitizer (tradename: Irgacure 651, manufactured by Ciba Specialty Chemicals, K.K.) | 5 parts |

The composition was diluted with methyl ethyl ketone (MEK) to adjust the solid content of the composition to 50%.

Composition F-1:

| | |
|---|---|
| Resin solution of Production Example I-6 (on a solid basis) | 100 parts |
| Silicone: methyl polysiloxanes containing trimethyl-siloxysilicic acid (tradename: X-21-3056, manufactured by The Shin-Etsu Chemical Co., Ltd) | 1 part |
| Polyfunctional monomer (tradename: NK Oligo U-15HA, manufactured by Shin-Nakamura Chemical Co., Ltd.) | 25 parts |
| Photosensitizer (tradename: Irgacure 907, manufactured by Ciba Specialty Chemicals, K.K.) | 5 parts |

The composition was diluted with methyl ethyl ketone (MEK) to adjust the solid content of the composition to 50%.

Composition F-2:

| | |
|---|---|
| Resin solution of Production Example I-6 (on a solid basis) | 100 parts |
| Silicone: methyl polysiloxanes containing trimethyl-siloxysilicic acid (tradename: X-21-3056, manufactured by The Shin-Etsu Chemical Co., Ltd) | 1 part |
| Polyfunctional monomer (tradename: NK Oligo U-15HA, manufactured by Shin-Nakamura Chemical Co., Ltd.) | 25 parts |
| Aluminum coupling agent (ALCH-TR, manufactured by Kawaken Fine Chemicals Co., Ltd. | 1 part |
| Photosensitizer (tradename: Irgacure 907, manufactured by Ciba Specialty Chemicals, K.K.) | 5 parts |

The composition was diluted with methyl ethyl ketone (MEK) to adjust the solid content of the composition to 50%.

Composition G:

| | |
|---|---|
| Resin solution of Production Example II-1 (on a solid basis) | 100 parts |
| Silicone: methyl polysiloxanes containing trimethyl-siloxysilicic acid (tradename: KF-7312, manufactured by the Shin-Etsu Chemical Co., Ltd) | 1 part |
| Polyfunctional monomer (tradename: SR-399, manufactured by Sartomer) | 20 parts |
| Photosensitizer (tradename: Irgacure 907, manufactured by Ciba Specialty Chemicals, K.K.) | 5 parts |

The composition was diluted with methyl ethyl ketone (MEK) to adjust the solid content of the composition to 50%.

Composition H:

| | |
|---|---|
| Resin solution of Production Example II-2 (on a solid basis) | 100 parts |
| Silicone: amino-modified reactive silicone oil (both ends modification type) (tradename: KF-8012, manufactured by The Shin-Etsu Chemical Co., Ltd) | 1 part |
| Polyfunctional monomer (tradename: SR-399, manufactured by Sartomer) | 20 parts |
| Photosensitizer (tradename: Irgacure 651, manufactured by Ciba Specialty Chemicals, K.K.) | 5 parts |

The composition was diluted with methyl ethyl ketone (MEK) to adjust the solid content of the composition to 50%.

Composition I:

| | |
|---|---|
| Resin solution of Production Example II-3 (on a solid basis) | 100 parts |
| Silicone oil: amino-modified reactive silicone oil (side chain modification type) (tradename: KF-860, manufactured by The Shin-Etsu Chemical Co., Ltd) | 1 part |
| Polyfunctional monomer (tradename: NK Oligo U-15HA, manufactured by Shin-Nakamura Chemical Co., Ltd.) | 20 parts |
| Photosensitizer (tradename: Irgacure 907, manufactured by Ciba Specialty Chemicals, K.K.) | 5 parts |

The composition was diluted with methyl ethyl ketone (MEK) to adjust the solid content of the composition to 50%.

Composition J:

| | |
|---|---|
| Resin solution of Production Example II-4 (on a solid basis) | 100 parts |
| Silicone oil: amino-modified reactive silicone oil (one end type) (tradename: KF-8012, manufactured by The Shin-Etsu Chemical Co., Ltd) | 1 part |
| Polyfunctional monomer (tradename: SR-399, manufactured by Sartomer) | 20 parts |
| Photosensitizer (tradename: Irgacure 907, manufactured by Ciba Specialty Chemicals, K.K.) | 5 parts |

The composition was diluted with methyl ethyl ketone (MEK) to adjust the solid content of the composition to 50%.

Composition K:

| | |
|---|---|
| Resin solution of Production Example II-5 (on a solid basis) | 100 parts |
| Silicone: methacryl-modified silicone oil (tradename: X-22-164B, manufactured by The Shin-Etsu Chemical Co., Ltd) | 3 parts |
| Polyfunctional monomer (tradename: SR-399, manufactured by Sartomer) | 20 parts |
| Photosensitizer (tradename: Irgacure 651, manufactured by Ciba Specialty Chemicals, K.K.) | 5 parts |

The composition was diluted with methyl ethyl ketone (MEK) to adjust the solid content of the composition to 50%.

(1) Duplication of Holograms

Duplication of holograms was carried out using a continuous duplicator shown in FIG. 1.

EXAMPLES 2 to 7, 20 to 25 and 38 to 42

The photo-curable resin compositions of the present invention each were roll coated at a speed of 20 m/min on a 50-$\mu$m polyethylene terephthalate film (Diafoil T-600E, manufactured by Diafoil Hoechst Co., Ltd.), one side of which had been treated for improving the adhesion, in its treated surface. The coatings were dried at 100° C. to vaporize the solvent to obtain photosensitive films for duplication at a coverage of 2 g/m$^2$ on a dry film basis. All the films thus obtained were not tacky at room temperature, and could be stored in a roll form.

The duplicator had an emboss roller provided with a press stamper which had been prepared continuously from a master hologram prepared using a laser beam. Alternatively, a duplicated hologram may be prepared in a resin plate from a master hologram and applied onto a cylinder. The photosensitive films for duplication prepared above were set on the sheet feed side, followed by heat pressing at 150° C. to form fine concave-convex patterns. Subsequently, ultraviolet light was applied from a mercury lamp to perform photo-curing. An aluminum layer was then vapor deposited thereon by vacuum deposition to prepare reflection type relief holograms.

A liquid for an adhesive layer (NISSETSU PE-118+ CK101, manufactured by Nippon Carbide Industries Co., Ltd.) was roll coated on the surface thereof, and dried at 100° C. to vaporize the solvent. A silicone-treated PET film (SPO 5, manufactured by Tokyo Serofan Co., Ltd.) as a release film was laminated thereon to obtain adhesive layers at a coverage of 25 g/m$^2$ on a dry film basis. They are in a label form and can be used in prints, displays or the like for showing three-dimensional images.

(2) Formation of Diffraction Gratings

The same duplicator as used in the duplication of hologram, that is, a duplication shown in FIG. 1, was used.

EXAMPLES 8 to 13, 26 to 31 and 43 to 47

The photo-curable resin compositions of the present invention each were roll coated at a speed of 20 m/min on a 50-μm polyethylene terephthalate film (Diafoil T-600E, manufactured by Diafoil Hoechst Co., Ltd.), one side of which had been treated for improving the adhesion, in its treated surface. The coatings were dried at 100° C. to vaporize the solvent to obtain photosensitive films for duplication at a coverage of 2 g/m$^2$ on a dry film basis. All the films thus obtained were not tacky at room temperature, and can be stored in a roll form.

The duplicator had an emboss roller provided with a press stamper prepared continuously from a master diffraction grating written using an electron beam. Alternatively, a duplicated diffraction grating may be prepared in a resin plate from a master diffraction grating, and applied onto a cylinder. The photosensitive films for duplication prepared above were set on the sheet feed side, followed by heat pressing at 150° C. to form fine concave-convex patterns. Subsequently, ultraviolet light was applied from a mercury lamp to perform photo-curing. An aluminum layer was then vapor deposited thereon by vacuum deposition to prepare reflection type diffraction grating.

A liquid for an adhesive layer (NISSETSU PE-118+ CK101, manufactured by Nippon Carbide Industries Co., Ltd.) was roll coated on the surface thereof, and dried at 100° C. to vaporize the solvent. A silicone-treated PET film (SPO 5, manufactured by Tokyo Serofan Co., Ltd.) as a release film was laminated thereon to obtain adhesive layers at a coverage of 25 g/m$^2$ on a dry film basis. They are in a label form and can be used in prints, displays or the like for showing three-dimensional images.

(3) Formation of Holograms by Transfer

EXAMPLES 14 to 19, 32 to 37 and 48 to 52

A release layer was gravure coated at a speed of 20 m/min on a 25-μm polyethylene terephthalate film (Lumirror T60, manufactured by Toray Industries, Inc.), and dried at 100° C. to vaporize the solvent to obtain a film having a layer construction of release layer (coverage 1 g/m$^2$ on a dry film basis)/PET.

The release layer is a layer which, upon transfer of a transfer foil on an object, is transferred onto the surface of the object to constitute the outermost layer. The release layer is provided for improving the releasability and transferability of the transfer layer, and may be made of various conventional materials according to the kind of the substrate film. Materials for the release layer include, for example, polymethacrylic ester resin, polyvinyl chloride resin, cellulose resin, silicone resin, chlorinated rubber, casein, various surfactants, and metal oxides. They may be used alone or as a mixture of two or more. In particular, preferably, in the formation of the release layer, the material and the like are properly selected so that the force necessary for peeling the transfer layer from the substrate film is 1 to 5 g/in. (90° peel test). The release layer may be formed on the surface of the substrate film by preparing an ink for the release layer and applying the ink onto the surface of the substrate film by a conventional method, such as coating. The thickness of the release layer is preferably 0.1 to 2 μm from the viewpoint of the peel force, transferability and the like.

The photo-curable resin compositions of the present invention each were roll coated on the film having a layer construction of release layer/PET in its release layer. The coatings were dried at 100° C. to vaporize the solvent to obtain photosensitive films for duplication at a coverage of 2 g/m$^2$ on a dry film basis. All the films thus obtained were not tacky at room temperature, and could be stored in a roll form.

The duplicator had an emboss roller provided with a press stamper which had been prepared continuously from a master hologram prepared using a laser beam. Alternatively, a duplicated hologram may be prepared in a resin plate from a master hologram and applied onto a cylinder. The photosensitive films for duplication prepared above were set on the sheet feed side, followed by heat pressing at 150° C. to form fine concave-convex patterns. Subsequently, ultraviolet light was applied from a mercury lamp to perform photo-curing. An aluminum layer was then vapor deposited thereon by vacuum deposition to prepare reflection type relief holograms. An ink for an adhesive layer was gravure coated on the surface thereof, and the coating was dried at 100° C. to vaporize the solvent to obtain an adhesive layer at a coverage of 1 g/m$^2$ on a dry basis.

Material for the adhesive layer include conventional heat-sensitive adhesive materials, for example, rubbers, such as polyisoprene rubber, polyisobutyrene rubber, and styrene-butadiene rubber; (meth)acrylic esters, such as polymethyl (meth)acrylate, polyethyl (meth)acrylate, polypropyl (meth) acrylate, polybutyl (meth)acrylate, and poly-2-ethylhexyl poly(meth)acrylate; polyvinyl ethers, such as polyisobutyl ether; polyvinyl acetate; polyvinyl chlorides, such as vinyl chloride/vinyl acetate copolymer; polyamides, such as polyacrylamide and polymethylolacrylamide; vinyl chloride resins, such as polyvinyl chloride; polystyrene; polyester; polyolefin chloride; polyvinyl butyral; and other resins, such as vinyl acetate/octyl acrylate resin, vinyl acetate/butyl acrylate resin, and vinylidene chloride/butyl acrylate resin.

Any film may be used as the film for coating so far as the film has transferability and releasability. For example, biaxially stretched polyethylene terephthalate (PET) films are most preferred from the viewpoint of dimensional stability, heat resistance, toughness and the like. In addition to the PET films, polyvinyl chloride films, polypropylene films, polyethylene films, polycarbonate films, cellophane, polyvinyl alcohol films, acetate films, nylon films, polyamide films, polyamideimide films, ethylene/vinyl alcohol copolymer films, fluorine-containing films, various co-extruded films and the like may also be used. The thickness of the film is generally 5 to 200 μm, preferably 10 to 50 μm.

Thermal transfer was carried out on a plywood by means of a hot roll from the film side with the acrylic adhesive facing the plywood. Next, the release film was separated, and ultraviolet light was applied from a mercury lamp to cure the resin as the surface layer. Thus, transfer foils were obtained. They can be used in prints, displays or the like for showing three-dimensional images. Thermal transfer onto a vinyl chloride card was carried out by means of a transfer device. As a result, the transferability was good, and the adhesion was excellent.

Properties of the products obtained in the above examples are shown in Tables 5 to 7.

Comparative Example 1

A composition L was prepared which comprised the same components as the composition A-1, except that the same amount of a resin (a methacrylic resin/acrylic acid copolymer resin BR-77, manufactured by Mitsubishi Rayon Co., Ltd.) was used instead of the resin used in the composition A-1 in Example 1 and no silicone oil was used. The composition L was used to conduct the duplication of a hologram, the duplication of a diffraction grating and the formation of a hologram by transfer in the same manner as described above.

The properties were evaluated by the following methods.

Releasability (Releasability from Press Stamper)

The coated film was subjected to continuous duplication by 1000 m by means of a duplicator shown in FIG. 1, and the press stamper was then inspected for the deposition of the resin on the press stamper.

○ . . . Not deposited
X . . . Deposited

Chemical Resistance

Gauze impregnated with methyl ethyl ketone was reciprocated 100 times on the cured surface to rub the product with the gauze. The product was then inspected for the state of the surface. When the surface was not in an abnormal state, the chemical resistance was evaluated as good. On the other hand, when the surface was in an abnormal state, the chemical resistance was evaluated as failure.

○ . . . Good
X . . . Failure

Heat Resistance

The cured surface of the product was heated to 200° C. by means of a hot roll, and then held at that temperature for 3 min. The product was then inspected for a color change, deformation and the like. When there was no abnormal phenomenon, the heat resistance was evaluated as good. On the other hand, when yellowing, deformation or separation occurred, the heat resistance was evaluated as failure.

○ . . . Good
X . . . Failure

Scratch Resistance

The cured surface of the product was rubbed ten times with a steel wool of #0000. When there was no change in surface, the scratch resistance was evaluated as good. On the other hand, when the surface was scratched and clouded, the scratch resistance was evaluated as failure.

○ . . . Good
X . . . Failure

Suitability for Vapor Deposition

An aluminum layer was vacuum deposited on a hologram- or diffraction grating-formed surface. The adhesion was then evaluated by a cellophane tape cross-cut test.

☆ . . . Excellent vapor deposition properties
◎ . . . Very good vapor deposition properties
○ . . . Good vapor deposition properties
X . . . Poor vapor deposition properties Suitability for Transfer Foil An aluminum layer was vacuum deposited on a hologram- or diffraction grating-formed surface. An acrylic adhesive for heat sealing (a hot stamping agent) was then coated on the aluminum layer to prepare a transfer foil. Transfer onto a polyvinyl chloride card was carried out by means of a transfer device to evaluate the transferability and adhesion of the transfer foil.

○ . . . Good
X . . . Failure

Flexing Resistance

Letters were formed by embossing on the foil which had been transferred onto the polyvinyl chloride card. The card was then inspected for cracks in the letters formed by embossing.

○ . . . Not cracked
X . . . Cracked

TABLE 5

| | Composition used | Releasability | Chemical resistance | Scratch resistance | Suitability for deposition | Flexing resistance |
|---|---|---|---|---|---|---|
| Example 2 | A-1 | ○ | ○ | ○ | ○ | ○ |
| Example 3 | B-1 | ○ | ○ | ○ | ○ | ○ |
| Example 4 | C-1 | ○ | ○ | ○ | ○ | ○ |
| Example 5 | D-1 | ○ | ○ | ○ | ○ | ○ |
| Example 6 | E-1 | ○ | ○ | ○ | ○ | ○ |
| Example 7 | F-1 | ○ | ○ | ○ | ○ | ○ |
| Example 8 | A-1 | ○ | ○ | ○ | ○ | ○ |
| Example 9 | B-1 | ○ | ○ | ○ | ○ | ○ |
| Example 10 | C-1 | ○ | ○ | ○ | ○ | ○ |

TABLE 5-continued

| | Composition used | Releas-ability | Chemical resistance | Scratch resistance | Suitability for deposition | Flexing resistance |
|---|---|---|---|---|---|---|
| Example 11 | D-1 | ○ | ○ | ○ | ○ | ○ |
| Example 12 | E-1 | ○ | ○ | ○ | ○ | ○ |
| Example 13 | F-1 | ○ | ○ | ○ | ○ | ○ |
| Example 14 | A-1 | ○ | ○ | ○ | ○ | ○ |
| Example 15 | B-1 | ○ | ○ | ○ | ○ | ○ |
| Example 16 | C-1 | ○ | ○ | ○ | ○ | ○ |
| Example 17 | D-1 | ○ | ○ | ○ | ○ | ○ |
| Example 18 | E-1 | ○ | ○ | ○ | ○ | ○ |
| Example 19 | F-1 | ○ | ○ | ○ | ○ | ○ |
| Comp. Example 1 | L | ○ | × | × | ○ | × |

TABLE 6

| | Composition used | Releas-ability | Chemical resistance | Scratch resistance | Suitability for deposition | Flexing resistance |
|---|---|---|---|---|---|---|
| Example 20 | A-2 | ○ | ○ | ○ | ⊙ | ○ |
| Example 21 | B-2 | ○ | ○ | ○ | ⊙ | ○ |
| Example 22 | C-2 | ○ | ○ | ○ | ⊙ | ○ |
| Example 23 | D-2 | ○ | ○ | ○ | ⊙ | ○ |
| Example 24 | E-2 | ○ | ○ | ○ | ⊙ | ○ |
| Example 25 | F-2 | ○ | ○ | ○ | ☆ | ○ |
| Example 26 | A-2 | ○ | ○ | ○ | ⊙ | ○ |
| Example 27 | B-2 | ○ | ○ | ○ | ⊙ | ○ |
| Example 28 | C-2 | ○ | ○ | ○ | ⊙ | ○ |
| Example 29 | D-2 | ○ | ○ | ○ | ⊙ | ○ |
| Example 30 | E-2 | ○ | ○ | ○ | ⊙ | ○ |
| Example 31 | F-2 | ○ | ○ | ○ | ☆ | ○ |
| Example 32 | A-2 | ○ | ○ | ○ | ⊙ | ○ |
| Example 33 | B-2 | ○ | ○ | ○ | ⊙ | ○ |
| Example 34 | C-2 | ○ | ○ | ○ | ⊙ | ○ |
| Example 35 | D-2 | ○ | ○ | ○ | ⊙ | ○ |
| Example 36 | E-2 | ○ | ○ | ○ | ⊙ | ○ |
| Example 37 | F-2 | ○ | ○ | ○ | ☆ | ○ |
| Comp. Example 1 | L | ○ | × | × | ○ | × |

TABLE 7

| | Composition used | Releas-ability | Chemical resistance | Scratch resistance | Suitability for deposition | Flexing resistance |
|---|---|---|---|---|---|---|
| Example 38 | G | ○ | ○ | ○ | ○ | ○ |
| Example 39 | H | ○ | ○ | ○ | ○ | ○ |
| Example 40 | I | ○ | ○ | ○ | ○ | ○ |
| Example 41 | J | ○ | ○ | ○ | ○ | ○ |
| Example 42 | K | ○ | ○ | ○ | ○ | ○ |
| Example 43 | G | ○ | ○ | ○ | ○ | ○ |
| Example 44 | H | ○ | ○ | ○ | ○ | ○ |
| Example 45 | I | ○ | ○ | ○ | ○ | ○ |
| Example 46 | J | ○ | ○ | ○ | ○ | ○ |
| Example 47 | K | ○ | ○ | ○ | ○ | ○ |
| Example 48 | G | ○ | ○ | ○ | ○ | ○ |
| Example 49 | H | ○ | ○ | ○ | ○ | ○ |
| Example 50 | I | ○ | ○ | ○ | ○ | ○ |
| Example 51 | J | ○ | ○ | ○ | ○ | ○ |
| Example 52 | K | ○ | ○ | ○ | ○ | ○ |
| Comp. Example 1 | L | ○ | × | × | ○ | × |

What is claimed is:

1. A photo-curable resin composition comprising a urethane-modified acrylic resin represented by structural formula (I) or (II) and a release agent as indispensable components:

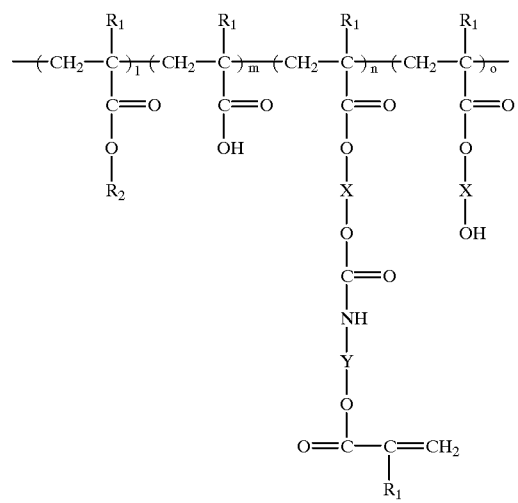

(I)

wherein five $R_1$'s each independently represent a hydrogen atom or a methyl group, $R_2$ represents a $C_1$–$C_{16}$ hydrocarbon group, X and Y each represent a straight-chain or branched alkylene group, and, with the sum of l, m, n, and o being 100, l is an integer of 20 to 90, m is an integer of 0 to 50, n is an integer of 10 to 80, and o is an integer of 0 to 20; and

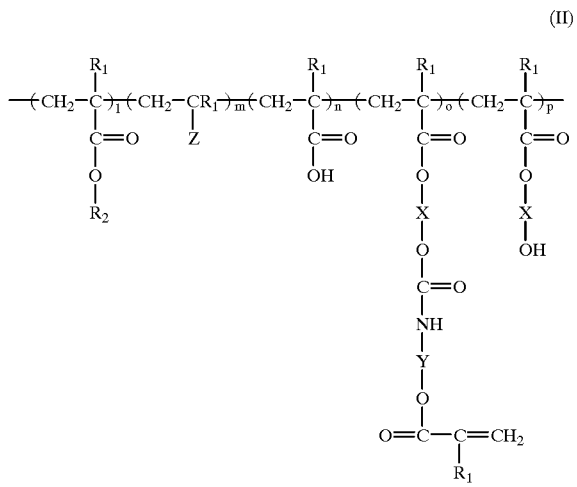

(II)

wherein Z represents a group having a bulky cyclic structure, six $R_1$'s each independently represent a hydrogen atom or a methyl group, $R_2$ represents a $C_1$–$C_{16}$ hydrocarbon group, X and Y each represent a straight-chain or branched alkylene group, and, with the sum of l, m, n, o, and p being 100, l is an integer of 20 to 90, m is an integer of 5 to 80, n is an integer of 0 to 50, o+p is an integer of 10 to 80, p is an integer of 0 to 40 and the resin has a molecular weight of 10,000 to 200,000 as measured using polystyrene as a standard.

2. The photo-curable resin composition according to claim 1, which contains the release agent in an amount of 0.1 to 50 parts by weight based on 100 parts by weight of the resin.

3. The photo-curable resin composition according to claim 1, wherein the release agent is a modified silicone oil.

4. The photo-curable resin composition according to claim 3, wherein the modified silicone oil is a reactive silicone oil.

5. The photo-curable resin composition according to claim 1, which further contains an organometal coupling agent.

6. The photo-curable resin composition according to claim 1, wherein the organometal coupling agent is a silane coupling agent, a titanium coupling agent, an aluminum coupling agent, or a mixture thereof, and is contained in an amount of 0.1 to 10 parts by weight based on 100 parts by weight of the resin.

7. The photo-curable resin composition according to claim 5, wherein the organometal coupling agent is an aluminum alcoholate, an aluminum chelate, or a cyclic aluminum oligomer.

8. The photo-curable resin composition according to claim 1, which further contains a polyfunctional monomer or a polyfunctional oligomer.

9. A method for forming a concave-convex pattern, comprising the steps of: coating the photo-curable resin composition according to claim 1 onto at least one side of a substrate and drying the coating to form a photo-curable resin layer; embossing the surface of the photo-curable resin layer; and exposing the resin layer to cure the resin layer.

10. The method according to claim 9, wherein the exposure is carried out using ultraviolet light or electron beam.

11. The method according to claim 9, wherein the concave-convex pattern is a diffraction grating or a relief hologram.

* * * * *